US011614032B2

(12) United States Patent
Boufford et al.

(10) Patent No.: US 11,614,032 B2
(45) Date of Patent: Mar. 28, 2023

(54) APU EDUCTOR PLENUM FLOW STABILITY SPLITTER

(71) Applicant: The Boeing Company, Chicago, IL (US)

(72) Inventors: Ryan Boufford, Seal Beach, CA (US); Sean P. Howe, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/510,679

(22) Filed: Oct. 26, 2021

(65) Prior Publication Data

US 2022/0213836 A1 Jul. 7, 2022

Related U.S. Application Data

(60) Provisional application No. 63/134,260, filed on Jan. 6, 2021.

(51) Int. Cl.
*F02C 3/02* (2006.01)
*F02C 3/32* (2006.01)

(52) U.S. Cl.
CPC .................. *F02C 3/02* (2013.01); *F02C 3/32* (2013.01); *F05D 2220/32* (2013.01)

(58) Field of Classification Search
CPC .......... F02C 3/02; F02C 3/32; F05D 2220/32; F05D 2260/601; F02K 1/28; F02K 1/36; F02K 1/38; F02K 1/383; F02K 1/386; F02K 1/40; F02K 1/42; F02K 1/46
See application file for complete search history.

(56) References Cited

U.S. PATENT DOCUMENTS 6,651,929 B2 * 11/2003 Dionne ................. B64D 41/00
165/44
2007/0089396 A1 * 4/2007 Anderson ............... F02K 1/386
60/200.1

* cited by examiner

*Primary Examiner* — Steven M Sutherland
(74) *Attorney, Agent, or Firm* — Felix L. Fischer (57) ABSTRACT

An eductor for an auxiliary power unit with a gas turbine engine and a load compressor incorporates an eductor housing having an cooling airflow inlet and a turbine exhaust inlet opening fluidly connected through a primary plenum to an outlet opening. A splitter plate is positioned in the primary plenum fixing a flow stagnation point with respect to a wall of the primary plenum.

20 Claims, 12 Drawing Sheets
(2 of 12 Drawing Sheet(s) Filed in Color)

APU EDUCTOR PLENUM FLOW STABILITY SPLITTER

REFERENCES TO RELATED APPLICATIONS

This application claims priority of U.S. provisional application Ser. No. 63/134,260 filed on Jan. 6, 2021 entitled APU EDUCTOR PLENUM FLOW STABILITY SPLITTER, having a common assignee with the present application, the disclosure of which is incorporated herein by reference.

BACKGROUND

Field

The present disclosure relates to an eductor for an auxiliary power unit of an aircraft. More particularly, the present disclosure is directed towards a housing of the eductor having a plenum with a splitter plate extending from an annular wall at the circumference of a primary plenum to induce flow stability by fixing a flow stagnation point.

Related Art

An aircraft may include an auxiliary power unit (APU), which serves as an additional energy source for starting a main engine. The APU may also provide the power required to operate onboard lighting, galley electrics, environmental control systems, and cockpit avionics while the aircraft is parked at the gate. The APU typically employs a gas turbine engine and a load compressor mounted in a compartment located within the tail cone of the aircraft.

During operation, the gas turbine produces exhaust gases that are directed through a nozzle and out of the aircraft through an aft exhaust opening in the tail cone of the aircraft. The nozzle may be connected to an eductor assembly that receives the exhaust gases generated by the gas turbine and employs the exhaust gas flow for entrainment of surge bleed air from the compressor and compartment air for the cooling of oil and APU components.

SUMMARY

The implementations disclosed herein provide an eductor for an auxiliary power unit with a gas turbine engine and a load compressor. The eductor incorporates an eductor housing having an cooling airflow inlet and a turbine exhaust inlet opening fluidly connected through a primary plenum to an outlet opening. A splitter plate is positioned in the primary plenum fixing a stagnation point with respect to a wall of the primary plenum.

A method for stabilizing a stagnation point in an eductor housing and enhancing mixing of gas turbine exhaust gases, oil cooler cooling air and surge bleed flow is provided by the example implementations. A flow of exhaust gases is received from a gas turbine engine of an APU through an exhaust gas inlet opening in an eductor housing. Cooling air is received from an oil cooler for the gas turbine engine through a cooling air inlet in the eductor housing. The cooling air inlet is parallel to a first diametric plane of an annular volume of a primary plenum and the annular volume and exhaust gas inlet opening are concentric about a longitudinal axis in the eductor housing. A stagnation point in air flow in the primary plenum is induced with a splitter plate located on an annular wall of the primary plenum in a second diametric plane of the annular volume.

The features, functions, and advantages that have been discussed may be achieved independently in various implementations or may be combined in other implementations further details of which can be seen with reference to the following description and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The drawings described herein are for illustration purposes only and are not intended to limit the scope of the present disclosure in any way.

DETAILED DESCRIPTION

The present disclosure relates to an eductor of an Auxiliary Power Unit in an aircraft and a splitter installed extending from an annular wall in a primary plenum in the eductor. The splitter is configured such that the airflow stagnation point within the primary plenum is maintained in a predetermined stationary position located at a 180° position relative to an inlet plane of an oil cooler inlet into the primary plenum. The splitter stabilizes the airflow within the eductor which enables the depth of the primary plenum to be reduced resulting in weight and volume savings.

Figure 1:
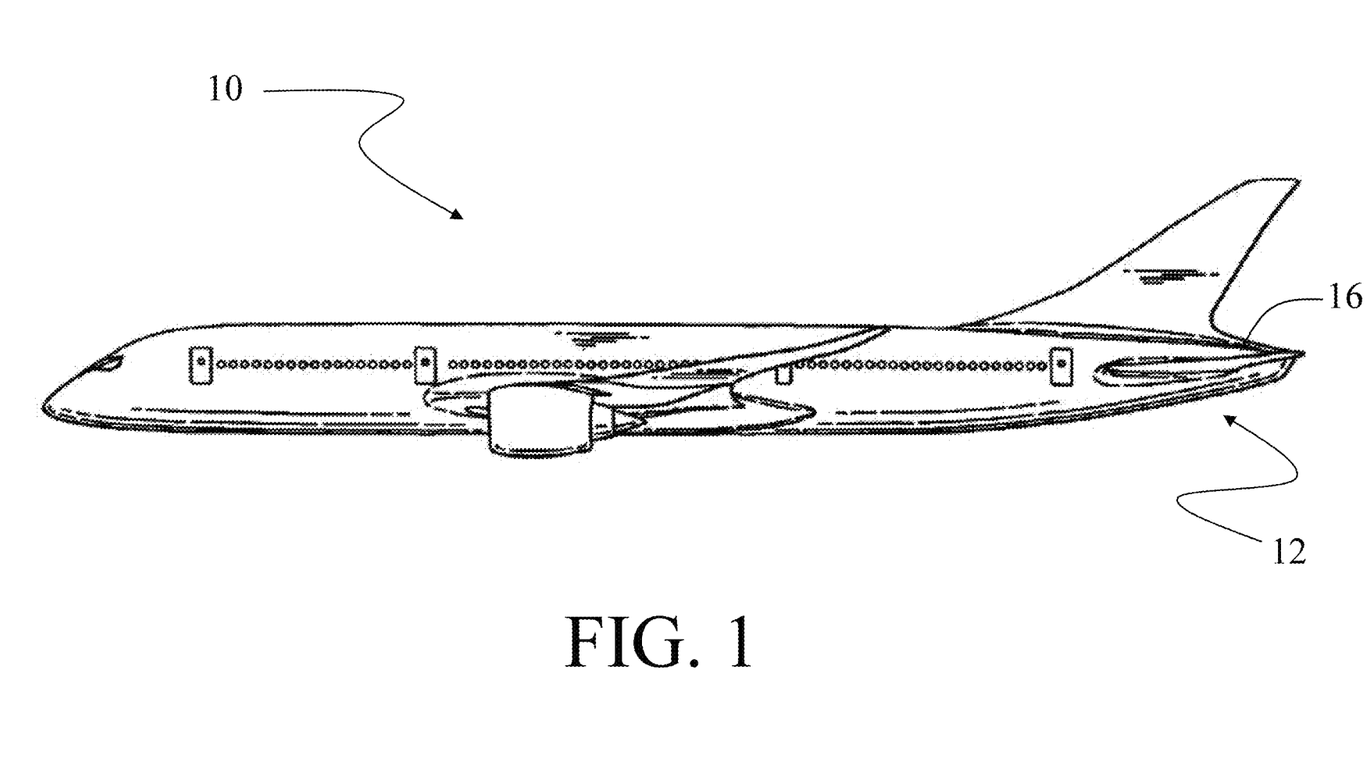
FIG. 1 is a representation of an aircraft having a tail cone housing an APU.
Figure 2:
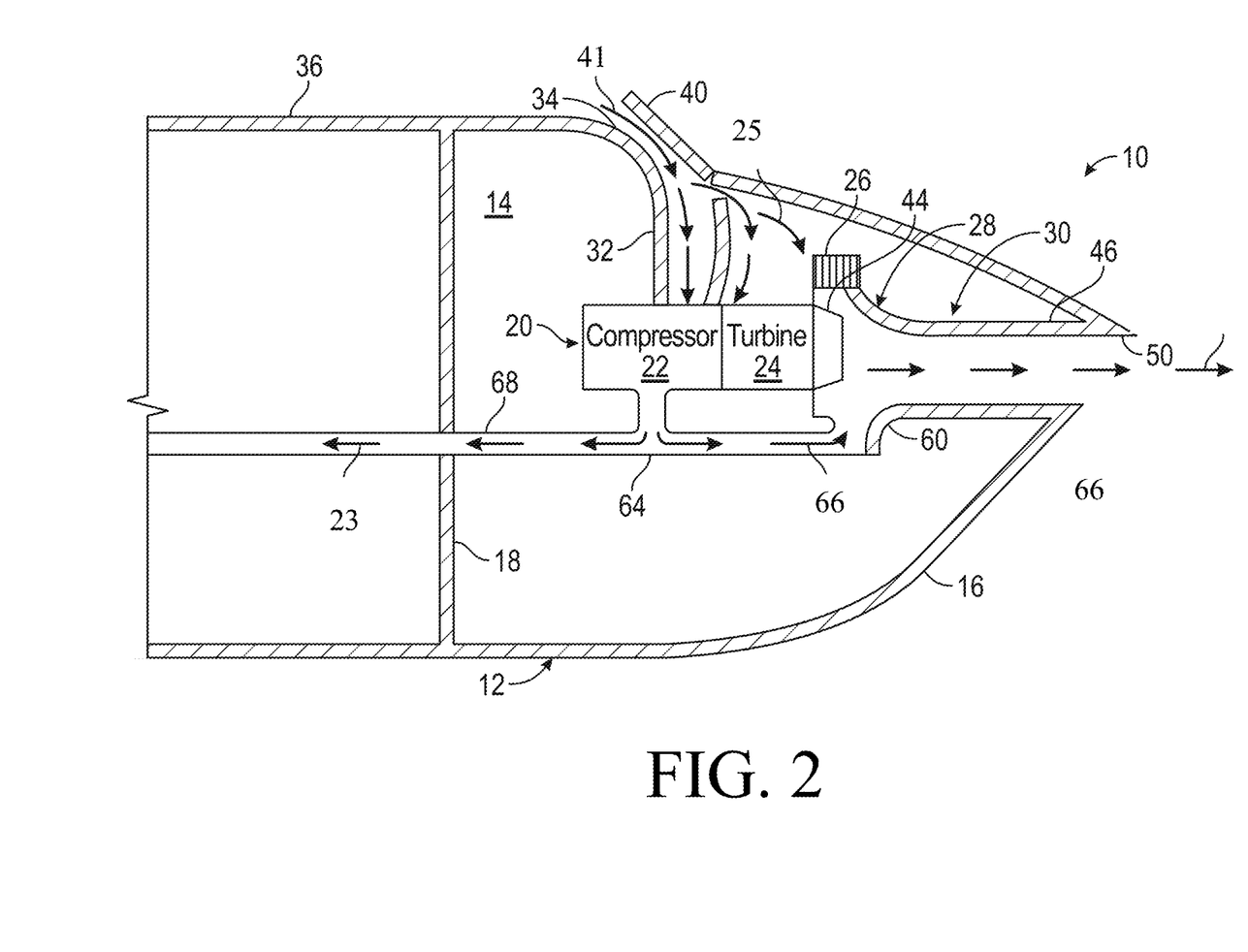
FIG. 2 is a schematic representation of the aircraft tail cone with the APU.
Figure 3:
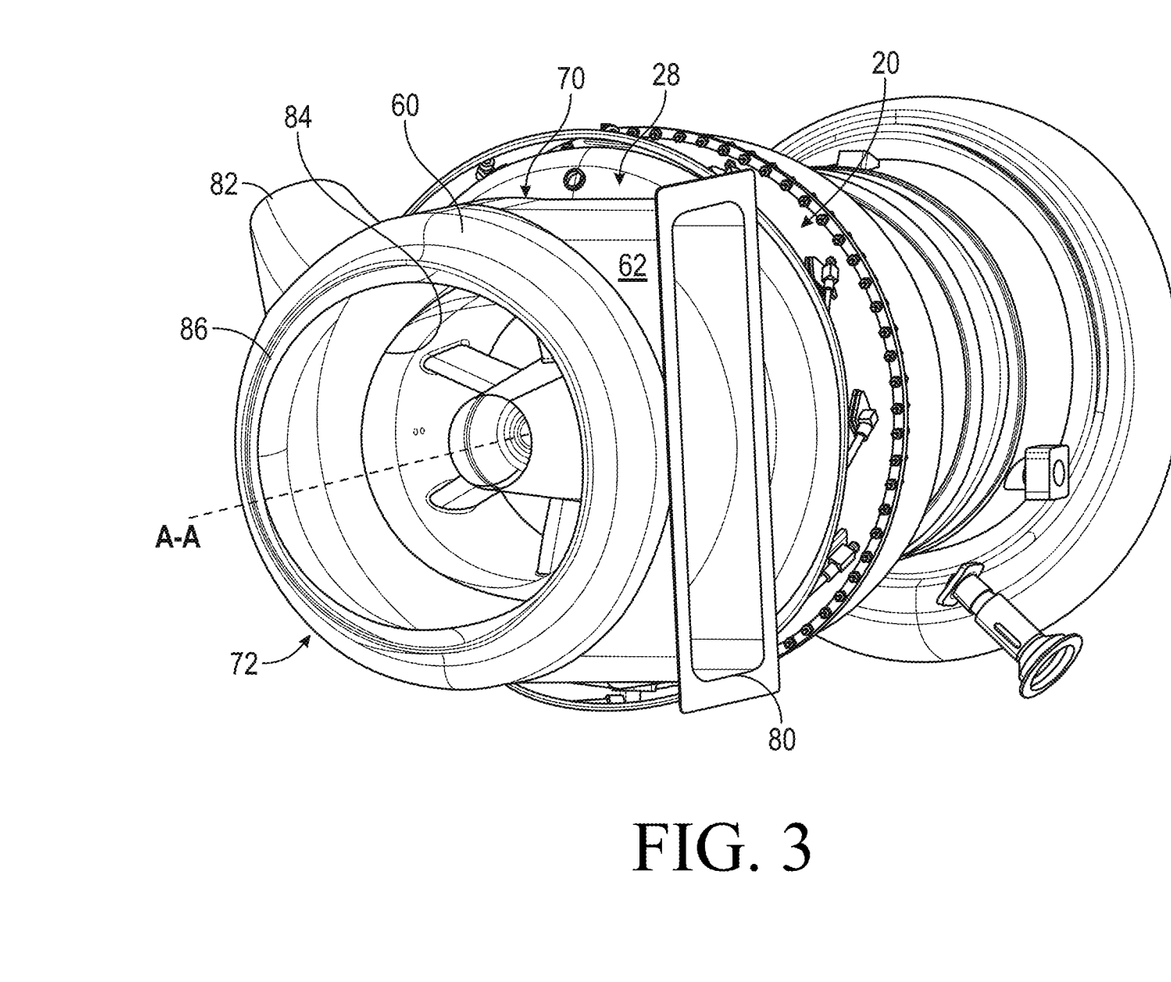
FIG. 3 is pictorial representation of an exemplary implementation of an eductor with the APU.

Referring to FIGS. 1, 2 and 3 a tail cone 12 of an aircraft 10 is shown. The aircraft 10 includes a compartment 14 disposed in the tail cone 12 of the aircraft 10. The compartment 14 contains an auxiliary power unit 20. The compartment 14 is defined by a fuselage skin 16 and an aft pressure bulkhead 18 of the aircraft 10. The auxiliary power unit 20 includes a load compressor 22 and a gas turbine engine 24 coupled to and configured to drive the load compressor 22. FIG. 2 also illustrates an oil cooler 26 for the gas turbine engine 24 incorporated in an eductor assembly 28, and an exhaust system 30. An intake duct 32 extends between an intake opening 34 and the load compressor 22 of the auxiliary power unit 20. A door 40 is disposed along an exterior surface 36 of the fuselage skin 16 and is pivotably attached to the exterior surface 36 of the aircraft 10. As seen in FIG. 2, when the door 40 is open, ambient air 41 flows into the intake duct 32 connected to provide the ambient air to the load compressor 22 and into the gas turbine engine 24 as combustion air. The intake duct is also connected to provide a portion of the ambient air 41 as cooling air 25. In the example implementation, the cooling air 25 is provided to the oil cooler 26 to cool the gas turbine engine oil flowing through the oil cooler 26. In alternative implementations, no oil cooler may be present and the cooling air flow 25 into the eductor is provided for compartment cooling and ventilation purposes (generically annotated herein as "cooling air").

The exhaust system 30 includes an exhaust nozzle 44 that is attached to the gas turbine engine 24. An eductor housing 60 of the eductor assembly 28 is connected between the exhaust nozzle 44 and an exhaust duct 46. In operation, the gas turbine engine 24 generates exhaust gases 27, also referred to herein as driving gases, that are discharged from the exhaust nozzle 44 through the eductor housing 60 and into the exhaust duct 46 creating a low pressure region within a primary plenum 90 (shown and described with respect to subsequent drawings). The low-pressure region causes ambient air 41 to be drawn from the compartment 14, through the oil cooler 26, and into the eductor housing 60 wherein the cooling air 25 is mixed with the gas turbine engine exhaust. The mixture of the cooling air and the turbine engine exhaust is referred to herein as the primary airflow 65 (shown and discussed with respect to subsequent drawings). The primary airflow 65 is then discharged through the exhaust duct 46 and exits the aircraft 10 via an aft exhaust opening 50.

Additionally, the load compressor 22 also receives a portion of the ambient air 41 from the intake duct 32, compresses the ambient air 41 into compressed air 23, and feeds the compressed air 23 through a conduit 68. The conduit 68 delivers the compressed air 23 to various pneumatic systems of the aircraft 10. However, any compressed air 23 not required by the various pneumatic systems, referred to herein as the surge bleed flow 66 (shown and discussed with respect to subsequent drawings), is directed, via a least one valve (not shown), through a surge bleed conduit 64 and into the eductor housing 60. The surge bleed flow 66 may also be referred to herein as the secondary airflow which is channeled through a surge bleed plenum 92 (shown in subsequent drawings).

Figure 4:
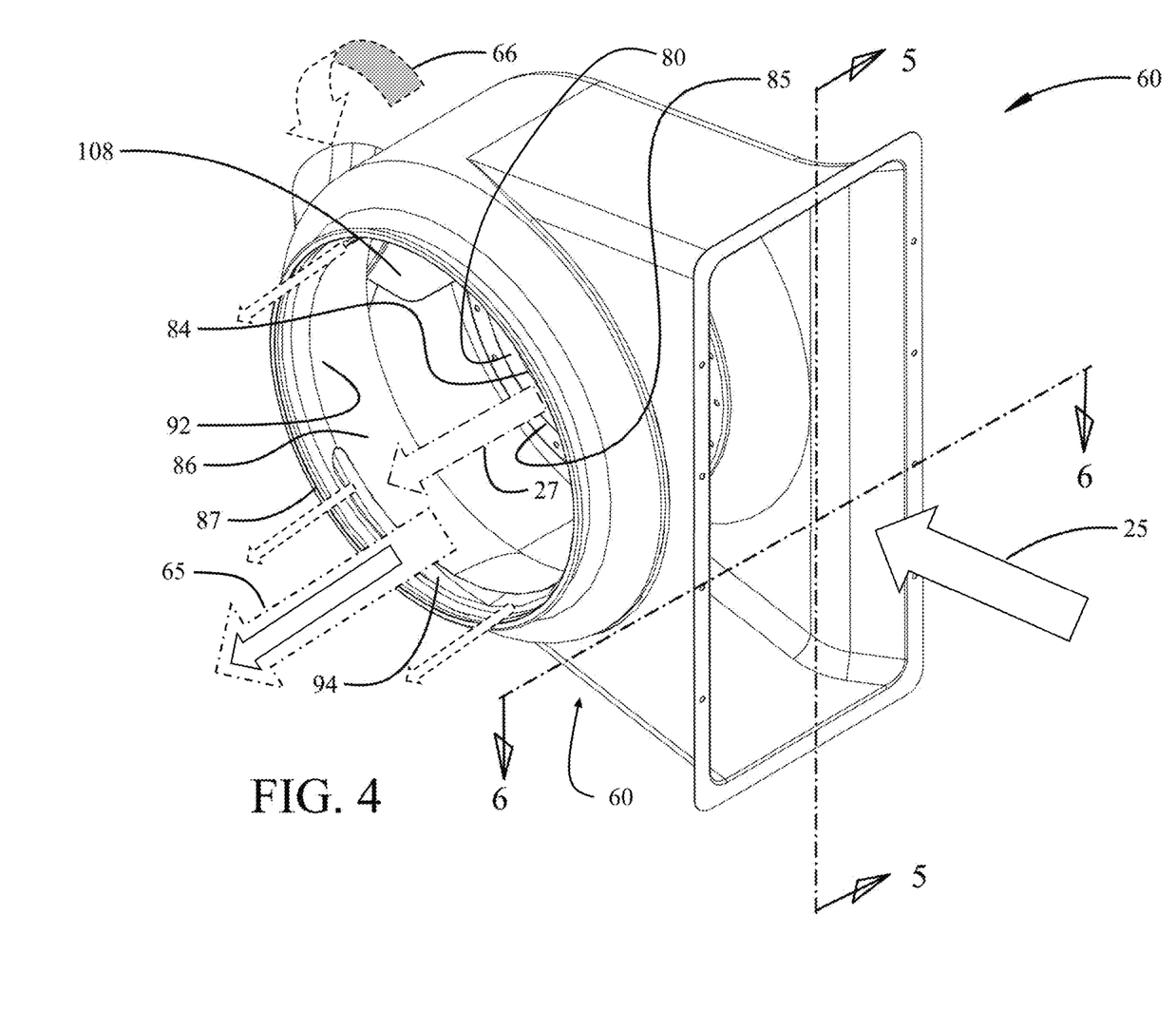
FIG. 4 is a detailed pictorial representation of the exemplary implementation of the eductor.
Figure 5A:
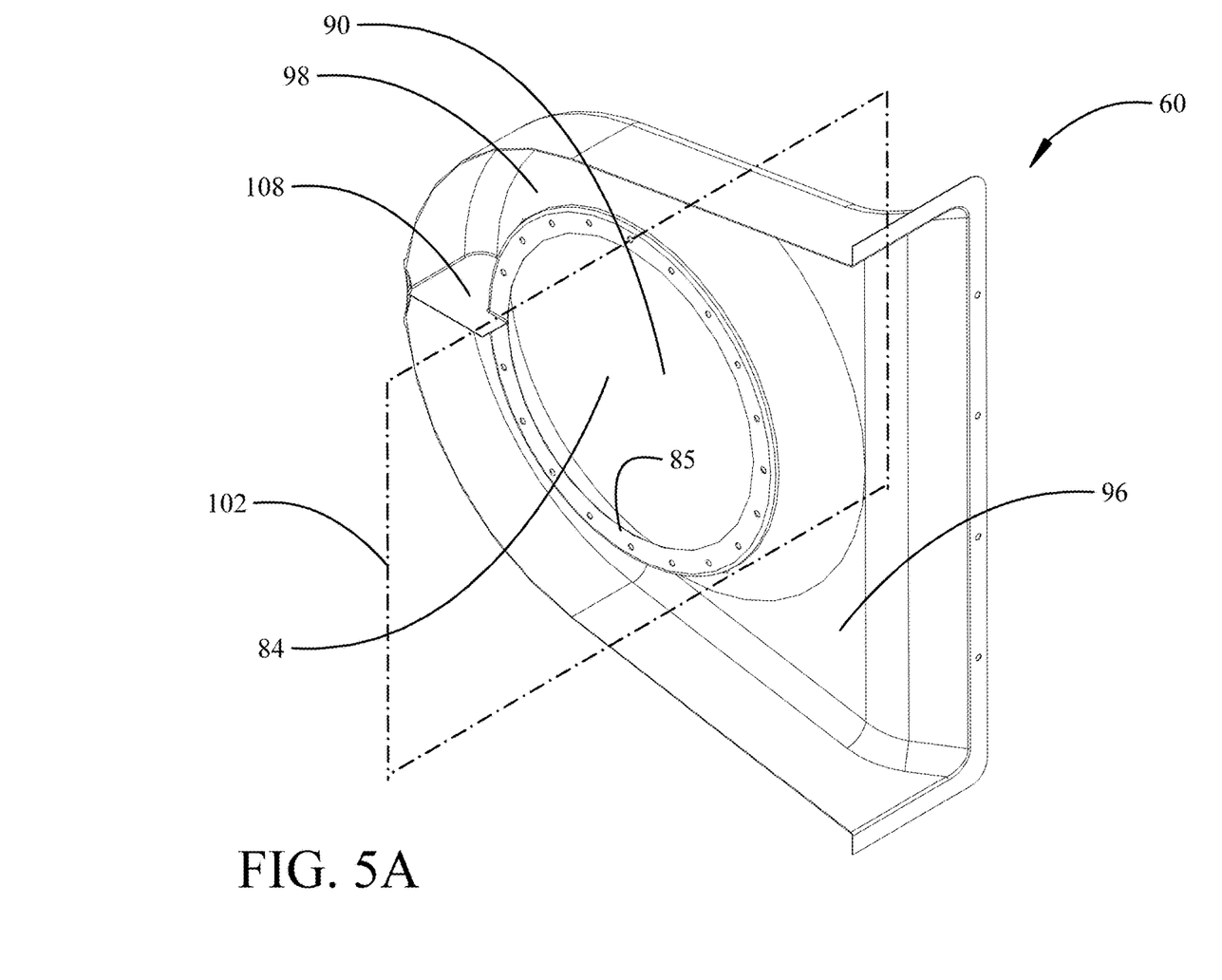
FIG. 5A is a detailed pictorial representation of the eductor with the eductor case sectioned along lines 5-5 of FIG. 4.
Figure 5B:
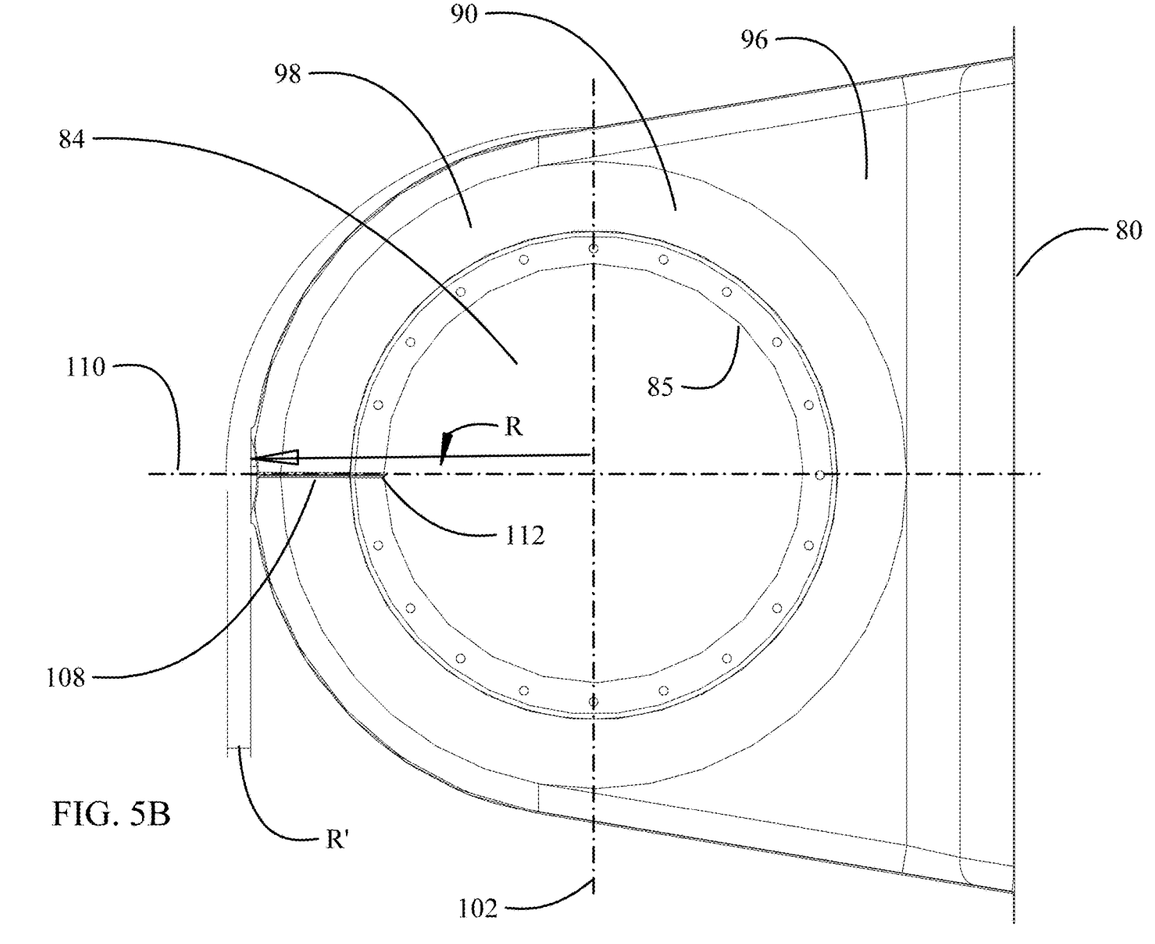
FIG. 5B is a detailed end view of the eductor with the eductor housing sectioned along lines 5-5 of FIG. 4.
Figure 6A:
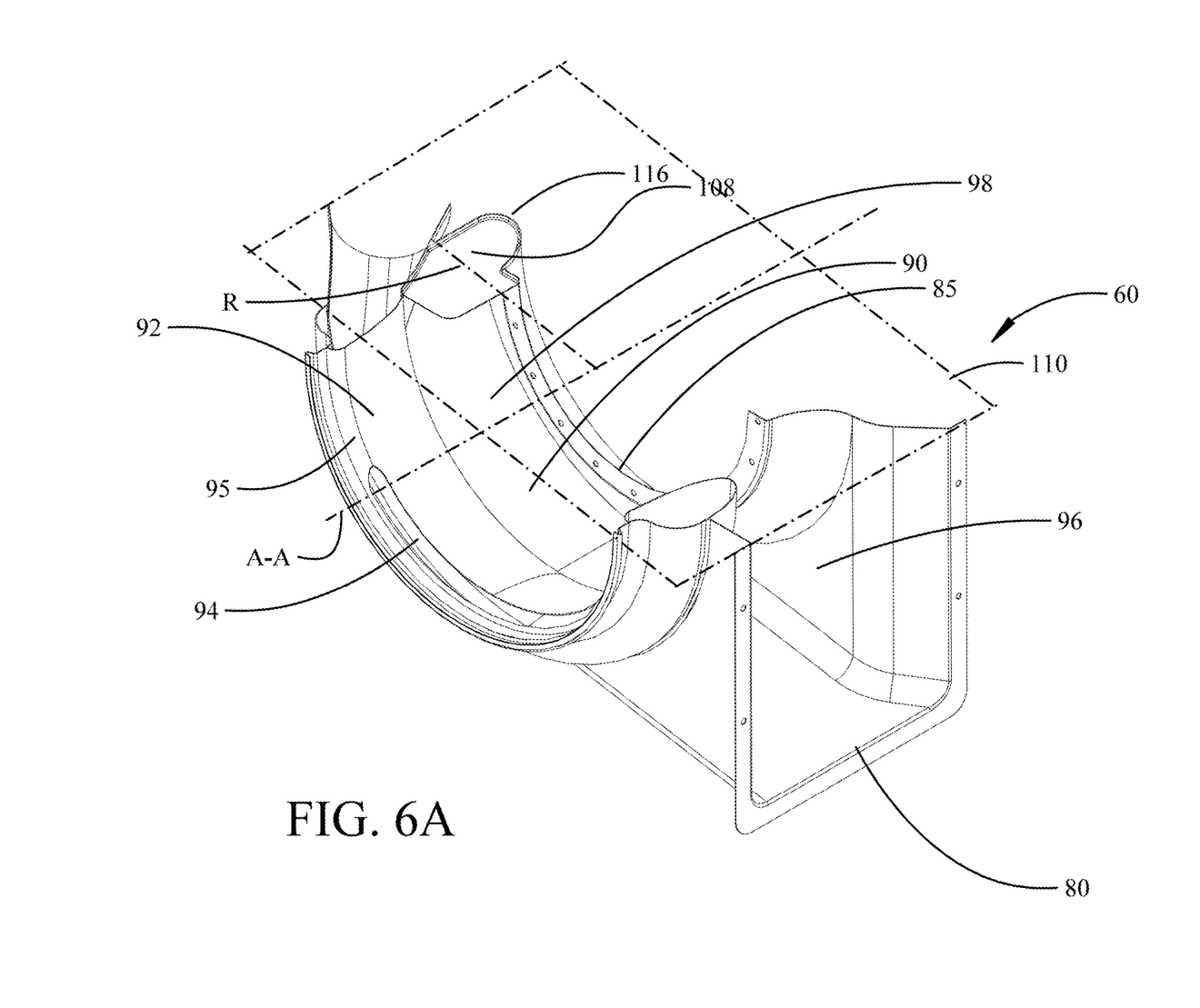
FIG. 6A is a detailed pictorial representation of the eductor with the eductor housing sectioned along lines 6-6 of FIG. 4.
Figure 6B:
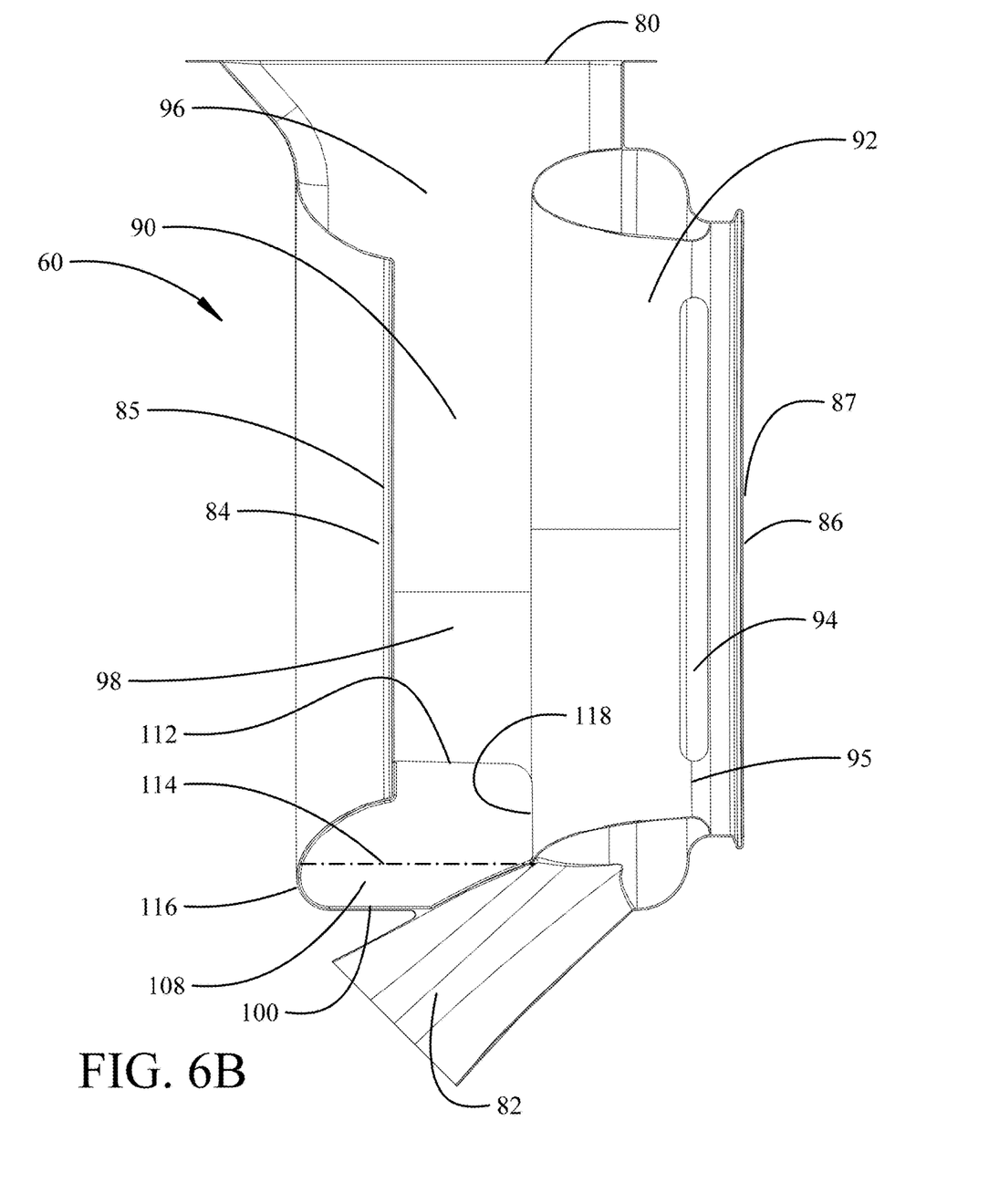
FIG. 6B is a detailed side view of the eductor housing sectioned along lines 6-6 of FIG. 4.
Figure 6C:
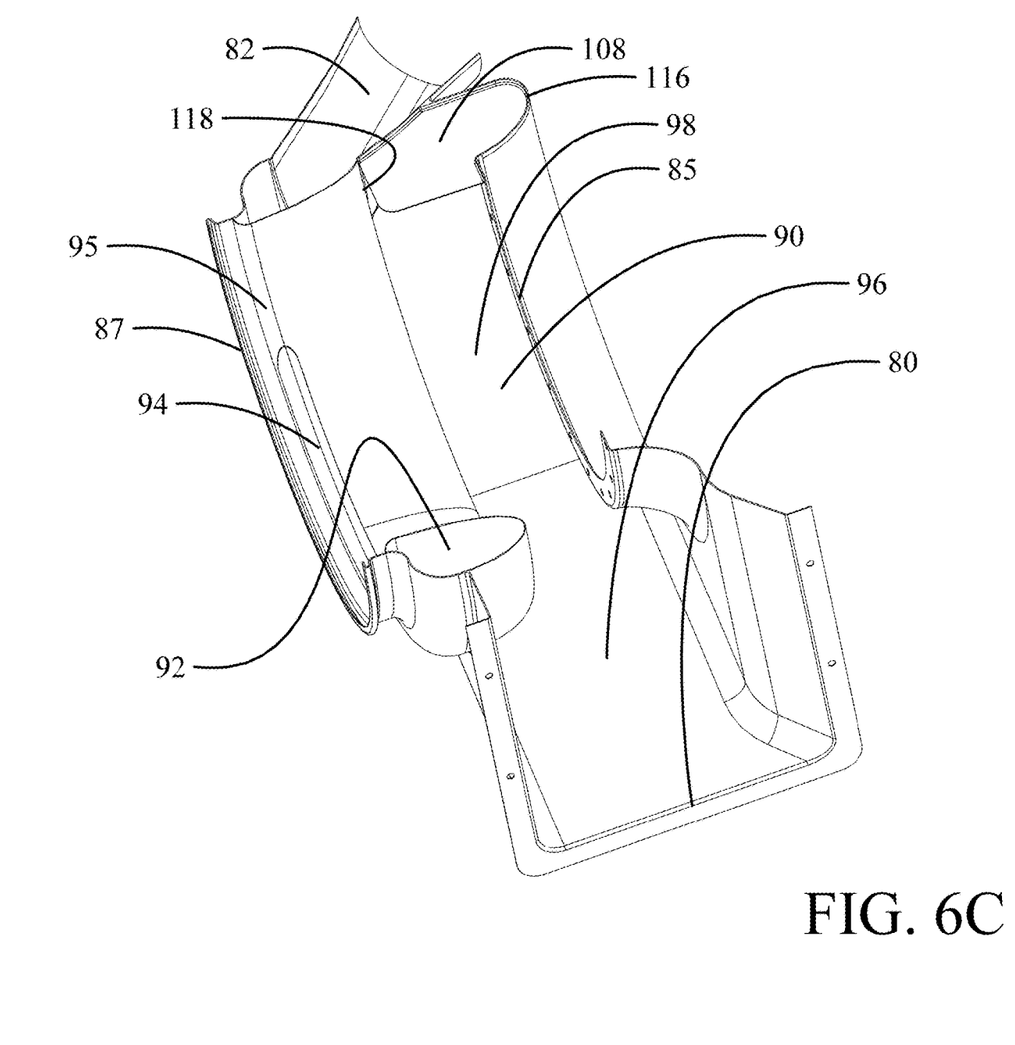
FIG. 6C is a section view showing details the surge bleed plenum and the primary plenum in the eductor housing.

FIG. 3 is a perspective view of the auxiliary power unit 20 that includes the load compressor 22, the gas turbine engine 24, the eductor housing 60, and the exhaust nozzle 44. FIG. 4 is a pictorial view of the eductor housing 60. FIGS. 5A and 5B are cross-sectioned views of the eductor housing 60 along lines 5-5 of FIG. 4 and FIGS. 6A and 6B are cross-sectioned views of the eductor housing 60 along lines 6-6 without the oil cooler. Referring to FIGS. 3-6B, the eductor housing 60 defines an upstream end portion 70 and a downstream end portion 72. The upstream end portion 70 of the eductor housing 60 connects to the turbine exhaust nozzle 44 and the downstream end portion 72 of the eductor housing 60 connects to the exhaust duct 46 (shown in FIG. 1).

The eductor housing 60 includes a main body 62 defining a longitudinal axis A-A, an cooling airflow inlet 80, a surge bleed flow inlet 82, a turbine exhaust inlet opening 84 defined by a forward flange 85 (configured to concentrically receive with the exhaust nozzle 44 of the gas turbine engine 24), and an outlet opening 86 defined by an aft flange 87 (for connection to the exhaust duct 46). The cooling airflow inlet 80 and the turbine exhaust inlet opening 84 are fluidly connected through a primary plenum 90 to the outlet opening 86. Both the turbine exhaust inlet opening 84 and the outlet opening 86 of the main body 62 of the eductor housing 60 have an annular profile concentric with the longitudinal axis A-A of the main body 62. In operation, as seen in FIG. 4, the exhaust gases 27 generated by the gas turbine engine 24 enter the eductor housing 60 through the turbine exhaust inlet opening 84, mix with the cooling air 25 entering through the cooling airflow inlet 80 in the primary plenum 90 to form the primary airflow 65. The surge bleed flow 66 enters the eductor housing through surge bleed flow inlet 82 and is directed through a surge bleed plenum 92, the surge bleed plenum having a toroidal shape concentric with the longitudinal axis A-A and exit slots 94, to entrain with the primary airflow exiting the primary plenum 90. In the example implementation the exit slots 94 are on an aft surface 95 of the surge bleed plenum 92. The combined primary airflow 65 and surge bleed flow 66 then flow through outlet opening 86 into the exhaust duct 46.

As seen in FIGS. 5A-6C, for the exemplary implementation, the primary plenum 90 has a rectilinear section 96 extending from the cooling airflow inlet 80 and merging into an annular volume 98 concentric with the axis A-A. The annular volume 98 has a modified semicylindrical wall 100 extending from a first diametric plane 102 of the annular volume 98 substantially at the interface of the rectilinear section 96 and the annular volume 98 parallel to the cooling airflow inlet 80. A "diametric plane" as defined herein is a plane including a radius of the annular volume and the longitudinal axis A-A. As used herein, the term "modified cylindrical" means smoothly lofted between the rectilinear section and annular volume and varying in diameter for an ellipsoidal circumference as will be described subsequently.

Figure 7A:
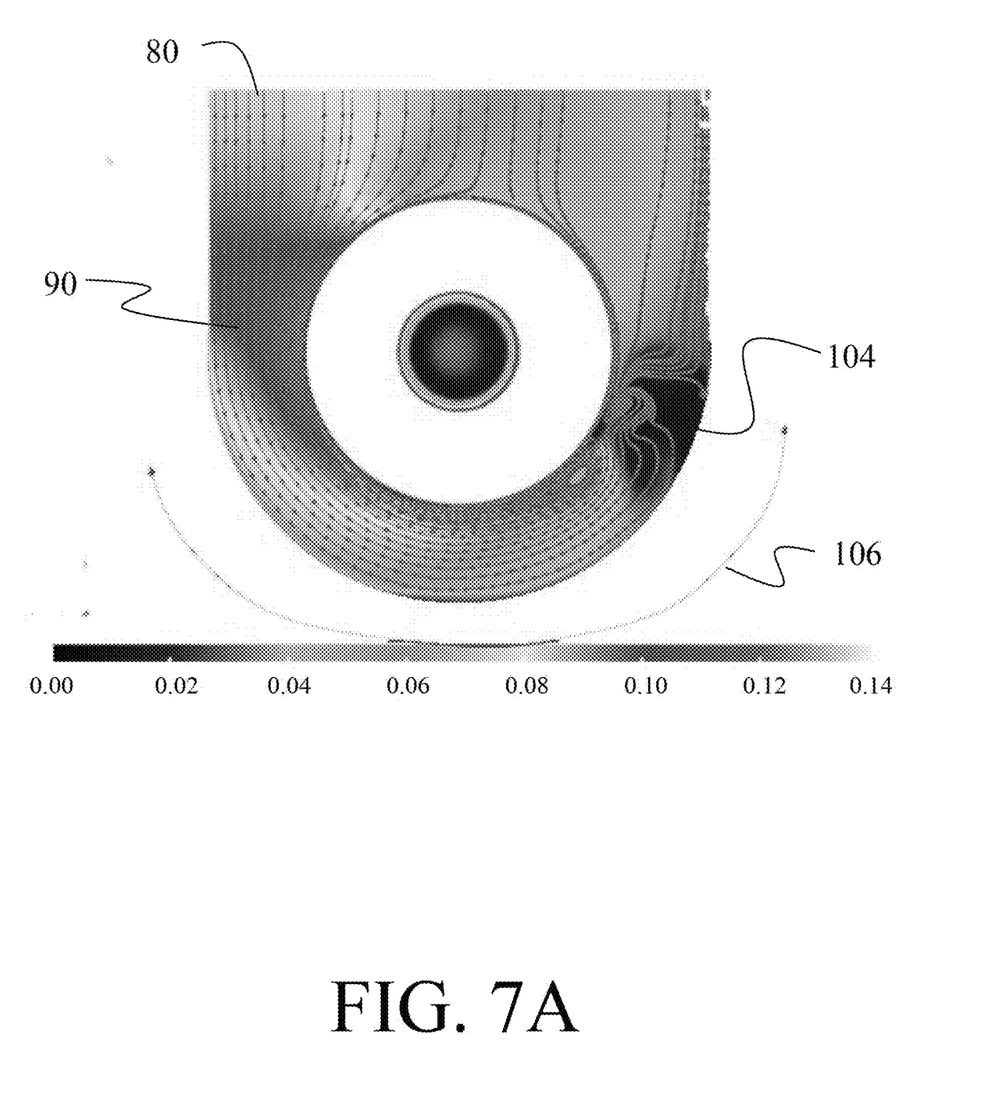
FIG. 7A is a depiction of fluid flow and pressure within an eductor without the splitter of the present implementation.
Figure 7B:
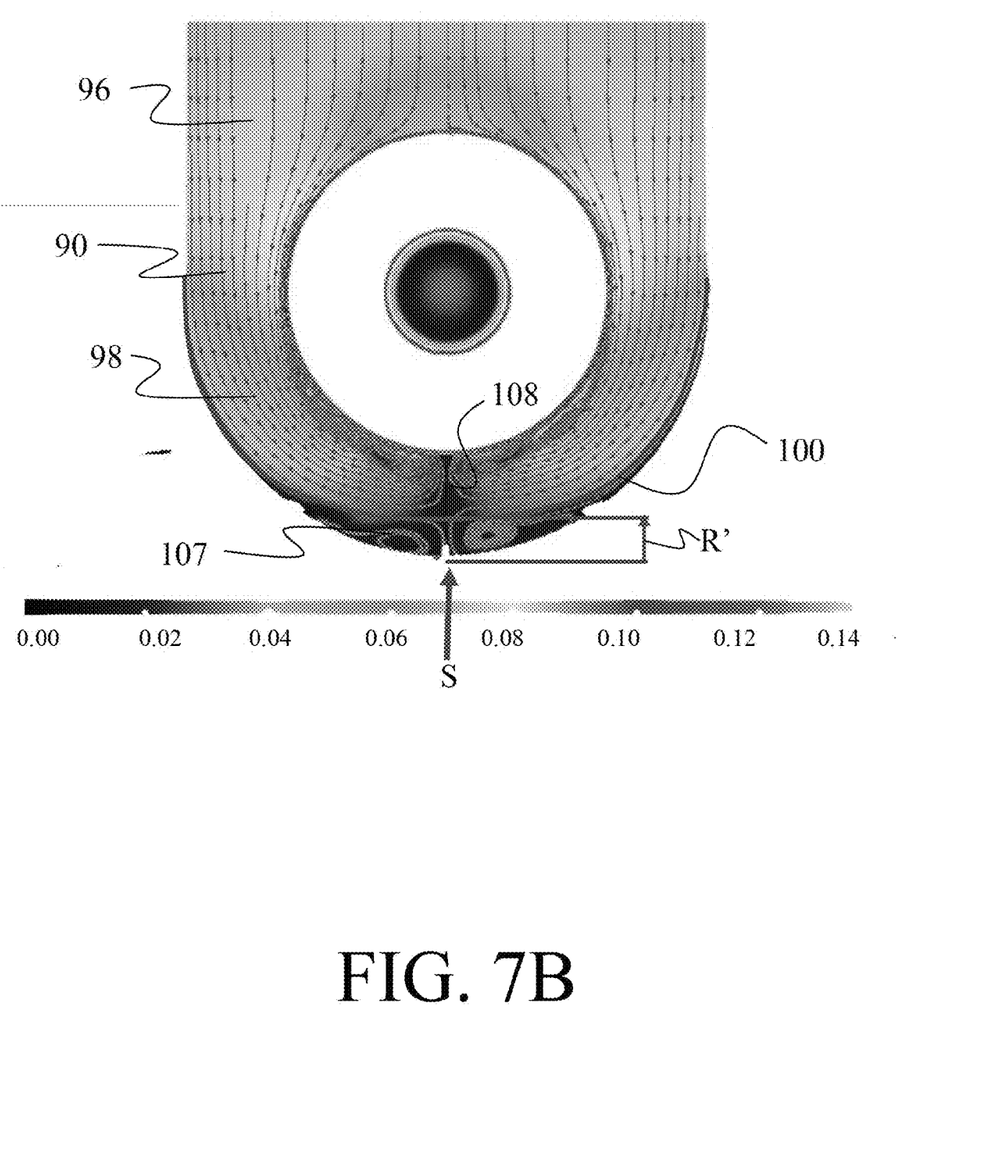
FIG. 7B is a depiction of fluid flow and pressure within an eductor of with a splitter demonstrating the allowable primary plenum depth reduction of the present implementation and, FIG. 8 illustrates a process flow diagram illustrating a method for mixing airflows in an eductor employing the disclosed implementations.

As seen in a flow visualization presented in FIG. 7A, in an eductor having an open cylindrical annulus, airflow entering the primary plenum 90 through the cooling airflow inlet 80 creates an oscillating stagnation point 104 (indicated by the turbulent flow) which may oscillate around the circumference of the annular volume as shown by arc 106. The example implementation incorporates a splitter plate 108 as seen in FIGS. 5A, 5B, 6A and 6B extending from the modified semicylindrical wall 100 in a second diametric plane 110 of the annular volume 98 not parallel to the first diametric plane 102 and the splitter plate 108 is opposite from the cooling airflow inlet 80 on the second diametric plane. For the example implementation the second diametric plane 110 is perpendicular to the first diametric plane 102. The splitter plate 108 fixes the stagnation point S at the location of the splitter plate on the modified semicylindrical wall 100 as seen in FIG. 7B. Fixing of the stagnation point enhances the aerodynamic stability of the primary flow through the eductor with improved mixing of the turbine exhaust gases 27 and cooling air 25, and subsequent mixing of the surge bleed flow 66 emanating from the exit slots 94 of the surge bleed plenum 92.

Fixing of the stagnation point also allows a reduction in radius R' from a purely cylindrical shape to a radius R (shown offset from the splitter plate 108 for clarity in FIG. 5B) of the modified semicylindrical wall 100 proximate the splitter plate adapted to eliminate the recirculation zone 107 seen in FIG. 7B. The reduction in radius R at the splitter plate 108 may result in a circumference of the wall having an ellipsoidal shape, best represented in FIG. 7B. Reduction to the radius R allows a reduced overall volume for the eductor housing 60 for better clearance where volume in the compartment 14 may be limited or other components in the compartment may require close tolerance packaging. The reduction in size of the eductor housing additionally results in weight reduction for the APU system and aircraft.

As seen in FIGS. 5A-6B, the splitter plate 108 extends from the modified semicylindrical wall 100 and terminates at an inner edge 112 substantially concentric with the diameter of the forward flange 85. A length 114 of the splitter plate 108 extends substantially from a forward extent 116 of the primary plenum 90 to a toroidal surface 118 of the surge bleed plenum 92 (as best seen in FIG. 6C) to substantially block an annular area of the primary plenum 90 at the desired stagnation point.

Figure 8:
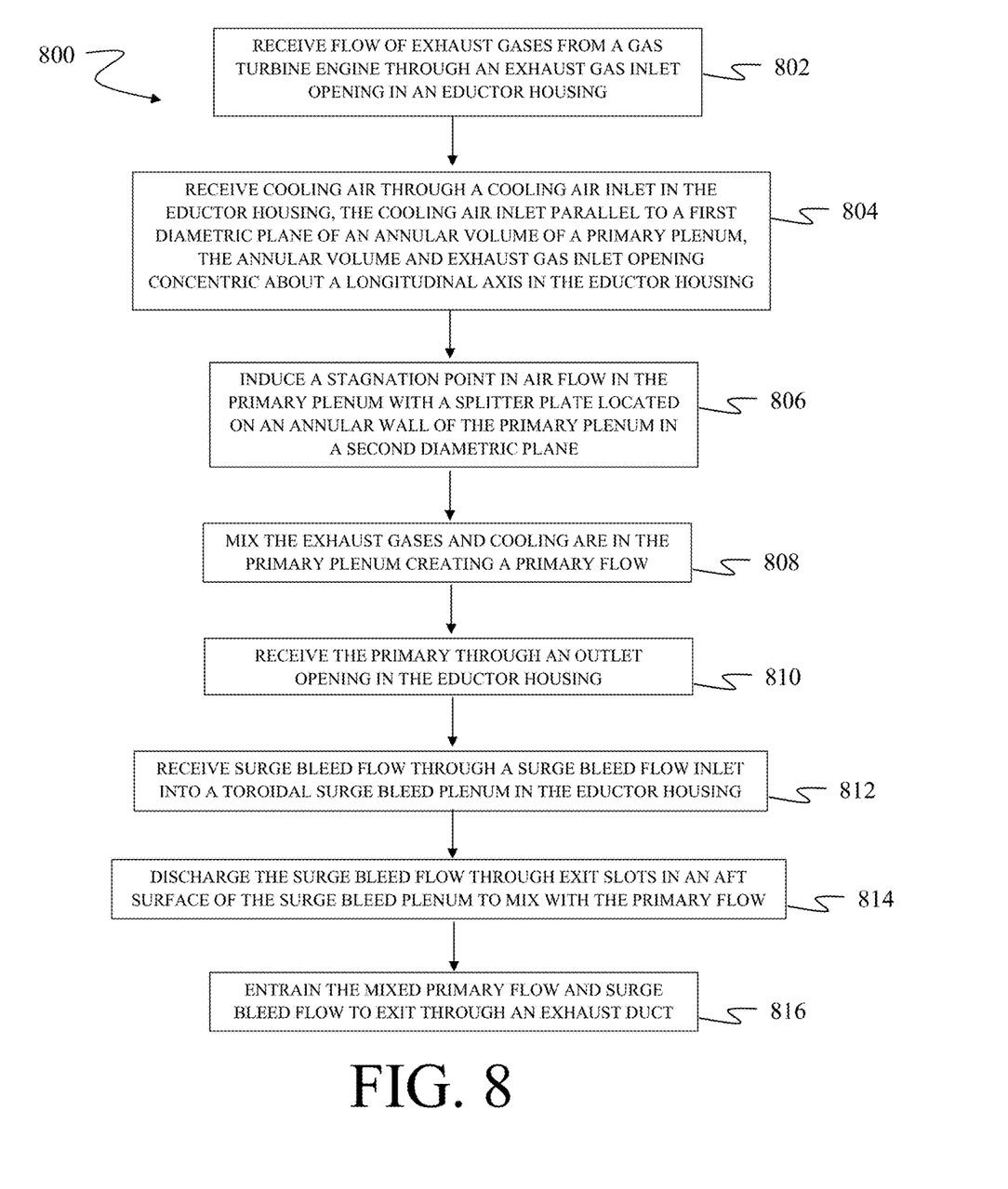

FIG. 8 demonstrates a method 800 for stabilizing the stagnation point in an eductor housing and enhancing mixing of gas turbine exhaust gases, oil cooler cooling air and surge bleed flow employing the disclosed implementations. Flow of exhaust gases from a gas turbine engine of an APU are received through an exhaust gas inlet opening in an eductor housing, step 802. Cooling air from an oil cooler for the gas turbine engine is received through a cooling air inlet in the eductor housing, the cooling air inlet parallel to a first diametric plane of an annular volume of a primary plenum, the annular volume and exhaust gas inlet opening concentric about a longitudinal axis in the eductor housing, step 804. A splitter plate in the primary plenum located on a modified semicylindrical wall of the annular volume in a second diametric plane of the annular volume induces a stagnation point in air flow in the primary plenum, step 806. The splitter plate is positioned with the second diametric plane not parallel to the first diametric plane and opposite the cooling air inlet. The exhaust gases and cooling air are mixed in the primary plenum creating a primary flow, step 808, which is then received through an outlet opening in the eductor housing, step 810. Surge bleed flow is received through a surge bleed flow inlet in the eductor housing into a toroidal surge bleed plenum concentric with the longitudinal axis, step 812, and the surge bleed flow is discharged through exit slots in an aft surface of the surge bleed plenum to mix with the primary flow, step 814. The mixed primary flow and surge bleed flow are entrained to exit through an exhaust duct, step 816.

Having now described various implementations in detail as required by the patent statutes, those skilled in the art will recognize modifications and substitutions to the specific implementations disclosed herein. Such modifications are within the scope and intent of the following claims. Within the specification and the claims, the terms "comprising", "incorporate", "incorporates" or "incorporating", "include", "includes" or "including", "has", "have" or "having", and "contain", "contains" or "containing" are intended to be open recitations and additional or equivalent elements may be present. As used herein the terms "upper" and "lower", "left" and "right", "longitudinal" and "lateral", "forward" and "aft" are employed to describe relative positioning and other than for the specific implementations disclosed may be substituted with appropriate descriptors such as "first" and "second", "top" and "bottom" or "right" and "left" depending on orientation of actual implementation.

What is claimed is:

1. An eductor assembly for an auxiliary power unit with a gas turbine engine and a load compressor, the eductor assembly comprising:
    an eductor housing having a cooling airflow inlet and a turbine exhaust inlet opening fluidly connected through a primary plenum to an outlet opening, the cooling airflow inlet parallel to a first diametric plane om am annular volume in the primary plenum; and,
    a splitter plate positioned in the primary plenum, said splitter plate configured to fix a stagnation point with respect to a wall of the primary plenum.

2. The eductor assembly as defined in claim 1 wherein the turbine exhaust inlet opening and the outlet opening are concentric to a longitudinal axis through the eductor housing and the primary plenum has a rectilinear section extending from the cooling airflow inlet and merging into the annular volume concentric with the longitudinal axis, wherein the wall is a modified semicylindrical wall in the annular volume extending from the first diametric plane of the annular volume substantially at an interface of the rectilinear section and the annular volume parallel to the cooling airflow inlet.

3. The eductor assembly as defined in claim 2 wherein the splitter plate extends from the modified semicylindrical wall in a second diametric plane of the annular volume perpendicular to the first diametric plane and opposite from the cooling airflow inlet.

4. The eductor assembly as defined in claim 3 wherein the modified semicylindrical wall has a reduced radius proximate the splitter plate adapted to eliminate a recirculation zone at the stagnation point. the reduced radius forming an ellipsoidal circumference of the wall.

5. The eductor assembly as defined in claim 2 wherein the eductor housing has a surge bleed flow inlet and further comprises a surge bleed plenum having a toroidal shape concentric with the longitudinal axis and exit slots to entrain surge bleed flow with a primary airflow exiting the primary plenum.

6. The eductor assembly as defined in claim 1 wherein the turbine exhaust inlet opening is defined by a forward flange configured to concentrically receive an exhaust nozzle of the gas turbine engine.

7. The eductor assembly as defined in claim 1 wherein the outlet opening is defined by an aft flange configured to connect to an exhaust duct.

8. An aircraft, in part comprising:
    an auxiliary power unit (APU) having a gas turbine engine and a load compressor, said APU mounted in a compartment having an intake duct for ambient air, the intake duct connected to provide the ambient air to the load compressor, the gas turbine engine as combustion air and an oil cooler for the gas turbine engine as cooling air, and an exhaust duct;
    an eductor assembly having an eductor housing and the oil cooler is mounted to an cooling airflow inlet of the eductor housing to receive flow of cooling air from the oil cooler, said eductor housing further having a turbine exhaust inlet opening receiving exhaust gases from the gas turbine engine, the cooling airflow inlet and the turbine exhaust inlet opening fluidly connected through a primary plenum to an outlet opening in the eductor housing, the cooling airflow inlet parallel to a first diametric plane in an annular volume in the primary plenum, the outlet opening connected to the exhaust duct; and,
    a splitter plate positioned in the primary plenum, said splitter plate configured to fix a stagnation point with respect to a wall of the primary plenum.

9. The aircraft as defined in claim 8 wherein the turbine exhaust inlet opening and the outlet opening are concentric to a longitudinal axis through the eductor housing and the primary plenum has a rectilinear section extending from the cooling airflow inlet and merging into the annular volume concentric with the longitudinal axis, the annular volume having a modified semicylindrical wall extending from the first diametric plane of the annular volume substantially at the interface of the rectilinear section and the annular volume and parallel to the cooling airflow inlet.

10. The aircraft as defined in claim 9 wherein the splitter plate extends from the modified semicylindrical wall in a second diametric plane of the annular volume perpendicular to the first diametric plane and opposite from the cooling airflow inlet.

11. The aircraft as defined in claim 9 wherein the eductor housing has a surge bleed flow inlet and further comprises a surge bleed plenum having a toroidal shape concentric with the longitudinal axis and exit slots to entrain surge bleed flow with a primary airflow exiting the primary plenum.

12. The aircraft as defined in claim 8 wherein the gas turbine engine has an exhaust nozzle and the turbine exhaust inlet opening is defined by a forward flange on the eductor housing configured to concentrically receive the exhaust nozzle.

13. The aircraft as defined in claim 8 wherein the outlet opening is defined by an aft flange on the eductor housing configured to connect to the exhaust duct.

14. A method stabilizing a stagnation point in an eductor housing and enhancing mixing of gas turbine exhaust gases, oil cooler cooling air and surge bleed flow, the method comprising:

receiving a flow of exhaust gases from a gas turbine engine of an APU through an exhaust gas inlet opening in an eductor housing;

receiving cooling air from an oil cooler for the gas turbine engine through a cooling airflow inlet in the eductor housing, the cooling airflow inlet parallel to a first diametric plane of an annular volume of a primary plenum, the annular volume and exhaust gas inlet opening concentric about a longitudinal axis in the eductor housing; and inducing a stagnation point in air flow in the primary plenum with a splitter plate located on a wall of the primary plenum in a second diametric plane of the annular volume.

15. The method of claim 14 further comprising positioning the splitter plate with the second diametric plane not parallel to the first diametric plane and opposite the cooling airflow inlet.

16. The method of claim 15 further comprising mixing the gas turbine exhaust gases and the cooling airflow in the primary plenum creating a primary airflow.

17. The method of claim 16 further comprising receiving the primary airflow through an outlet opening in the eductor housing.

18. The method of claim 17 further comprising receiving surge bleed flow through a surge bleed flow inlet in the eductor housing into a toroidal surge bleed plenum concentric with the longitudinal axis.

19. The method of claim 18 further comprising discharging the surge bleed flow through exit slots in an aft surface of the surge bleed plenum to mix with the primary airflow.

20. The method of claim 19 further comprising entraining the mixed primary flow and surge bleed flow to exit through an exhaust duct.

* * * * *

UNITED STATES PATENT AND TRADEMARK OFFICE
CERTIFICATE OF CORRECTION

PATENT NO. : 11,614,032 B2
APPLICATION NO. : 17/510679
DATED : March 28, 2023
INVENTOR(S) : Ryan Boufford and Sean P. Howe It is certified that error appears in the above-identified patent and that said Letters Patent is hereby corrected as shown below:

In the Claims

Column 6, In Claim 1 Line 2 "om am" is corrected to read "in an".

Signed and Sealed this
Ninth Day of May, 2023

Katherine Kelly Vidal
*Director of the United States Patent and Trademark Office*